United States Patent [19]

Sargeant et al.

[11] Patent Number: 5,117,140
[45] Date of Patent: May 26, 1992

[54] STATOR STABILIZING ASSEMBLIES

[75] Inventors: John B. Sargeant, Oviedo, Fla.; Jan W. Seyler, Guelph, Canada

[73] Assignee: Westinghouse Electric Corp., Pittsburgh, Pa.

[21] Appl. No.: 699,091

[22] Filed: May 13, 1991

[51] Int. Cl.⁵ .............................................. H02K 5/00
[52] U.S. Cl. ...................................... 310/91; 310/51; 310/89; 310/157; 310/258
[58] Field of Search ............... 310/157, 217, 258, 254, 310/51, 89, 91; 248/603, 655

[56] References Cited

U.S. PATENT DOCUMENTS

| 2,424,299 | 7/1947 | Baudry | 310/257 |
| 3,023,324 | 2/1962 | Kamphaus | 310/91 |
| 3,293,464 | 12/1966 | Spirk | 310/157 |
| 3,387,152 | 6/1968 | Mücke | 310/157 |
| 4,012,654 | 3/1977 | Starcevic | 310/91 |
| 4,060,744 | 11/1977 | Starcevic | 310/157 |

FOREIGN PATENT DOCUMENTS

| 1059489 | 7/1979 | Canada | 310/157 |
| 0899829 | 11/1953 | Fed. Rep. of Germany | 310/157 |
| 1217490 | 5/1966 | Fed. Rep. of Germany | 310/157 |
| 2249978 | 5/1973 | Fed. Rep. of Germany | 310/157 |

Primary Examiner—R. Skudy

[57] ABSTRACT

An electromagnetic rotating machine having an annular stator and a rotor disposed within the stator, the stator including a frame and stator laminations secured to the frame and located radially inwardly of the frame, and the stator being mounted on a rigid foundation such that the rotor has a vertical axis of rotation, and stator shape stabilizing devices connected between the stator frame and the foundation at a plurality of spaced points around the stator frame for imposing outwardly directed radial forces on the frame at the spaced points in a manner to maintain a circular configuration for the frame.

9 Claims, 2 Drawing Sheets

STATOR STABILIZING ASSEMBLIES

BACKGROUND OF THE INVENTION

The present invention relates to the stabilization of rotating machine stators, particularly those of large electromagnetic rotating machines having a vertical axis of rotation.

Many machines of this type, for example large hydroelectric generators, which have a large diameter compared to their axial dimension, include a stator which is relatively thin in the radial direction. Such a stator is composed basically of a frame and stator laminations extending radially inwardly from, and secured to, the frame.

When such a machine is in operation, an attractive magnetic force acts radially in the air gap between the rotor and the stator, which force acts radially inwardly on the stator. The magnitude of such force is a function, inter alia, of machine diameter, so that particularly large forces exist in the case of large diameter machines of the type described above. The magnitude of such forces, together with the small radial dimension of the stator frame of such a machine, results in the creation of a compressive force, known as a hoop force, which can be sufficient to render the stator structure unstable, in the same manner that a slender column becomes laterally unstable when subjected to a sufficiently high vertical load. When a circular, annular body is subjected to a circumferentially distributed, inwardly radially directed force, the body tends to respond by assuming an elliptical shape.

If a stator of the type here under consideration should become deformed into an elliptical shape, even if such deformation is only very slight, one result will be a change in the circumferential distribution of magnetic attractive forces between the rotor and stator since, at any point around the circumference of the air gap, the magnitude of this force depends on the radial dimension or length, of the air gap. In other words, any elliptical deformation of the stator will result in a redistribution of magnetic forces which tends to maintain or even increase the degree of elliptical deformation.

A conventional approach to preventing deformation of the stator of such machines is to dimension the stator to have a sufficient degree of ring stiffness, i.e. a sufficient resistance to such deformation. In particular, this is achieved by giving the stator frame cross section a sufficiently large radial dimension.

However, when the stator frame is stiffened sufficiently in this manner, this can have adverse effects on the stator core laminations. Notably, such laminations can experience buckling because the larger structural cross section of the stator frame induces a higher compressive reaction on the stator core under various operating conditions, when a temperature differential exists between the frame and the core. Such core lamination buckling is highly undesirable because it results in a looseness of the laminations which can permit them to vibrate or break, as well causing wear of the winding insulation.

Generally, buckling occurs when the induced compressive hoop stress in the lamination structure, or stator core, exceeds a critical value. Basically, the sources of Compressive hoop stress in the stator laminations are: radial magnetic pull; radial interactive forces between the stator core and the stator frame, resulting from free thermal expansion of the stator core and counteracting resistance by the stator frame; frictional drag at the foundation; and frictional drag from any upper bracket structure. In general, the level of radial interactive force increases as the cross section of the stator frame increase, i.e. as the stator diameter increases and as the radial dimension of the frame cross section is increased to provide the desired elliptical stability.

Thus, the problems of buckling and elliptical instability, while of equal importance, have heretofore been considered to require conflicting solutions. In particular, prior art solutions to the problem of elliptical stability, which solutions include increasing the radial dimension of the stator frame or firmly securing the stator frame to a rigid foundation, have adverse influences on the problem of lamination buckling. Prior art solutions to the problem of buckling, which involves allowing radial deflections of the stator frame, inherently complicate the elliptical stability problem.

SUMMARY OF THE INVENTION

It is a primary object of the present invention to associate the stator of a machine of the type described above with devices which maintain the desired circular shape of the stator while reducing the forces which contribute to lamination buckling.

The above and other objects are achieved, according to the present invention, in an electromagnetic rotating machine having an annular stator and a rotor disposed within the stator, the stator including a frame and stator laminations secured to the frame and located radially inwardly of the frame, and the stator being mounted on a rigid foundation such that the rotor has a vertical axis of rotation, by the provision of stator shape stabilizing means connected to the stator frame at a plurality of spaced points around the stator frame for imposing outwardly directed radial forces on the frame at the spaced points in a manner to maintain a circular configuration for the frame.

Essentially, the present invention provides a plurality of devices which impose radially outwardly directed forces on the stator frame, without restraining the frame in a rigid manner, whereby the net forces, and particularly the net radial forces, acting on the frame can be given a value such that any departures by the stator frame from a circular outline will be kept at a small value, and yet the frame can yield radially to an extent sufficient to prevent lamination buckling.

DESCRIPTION OF THE PREFERRED EMBODIMENTS

Figure 1:
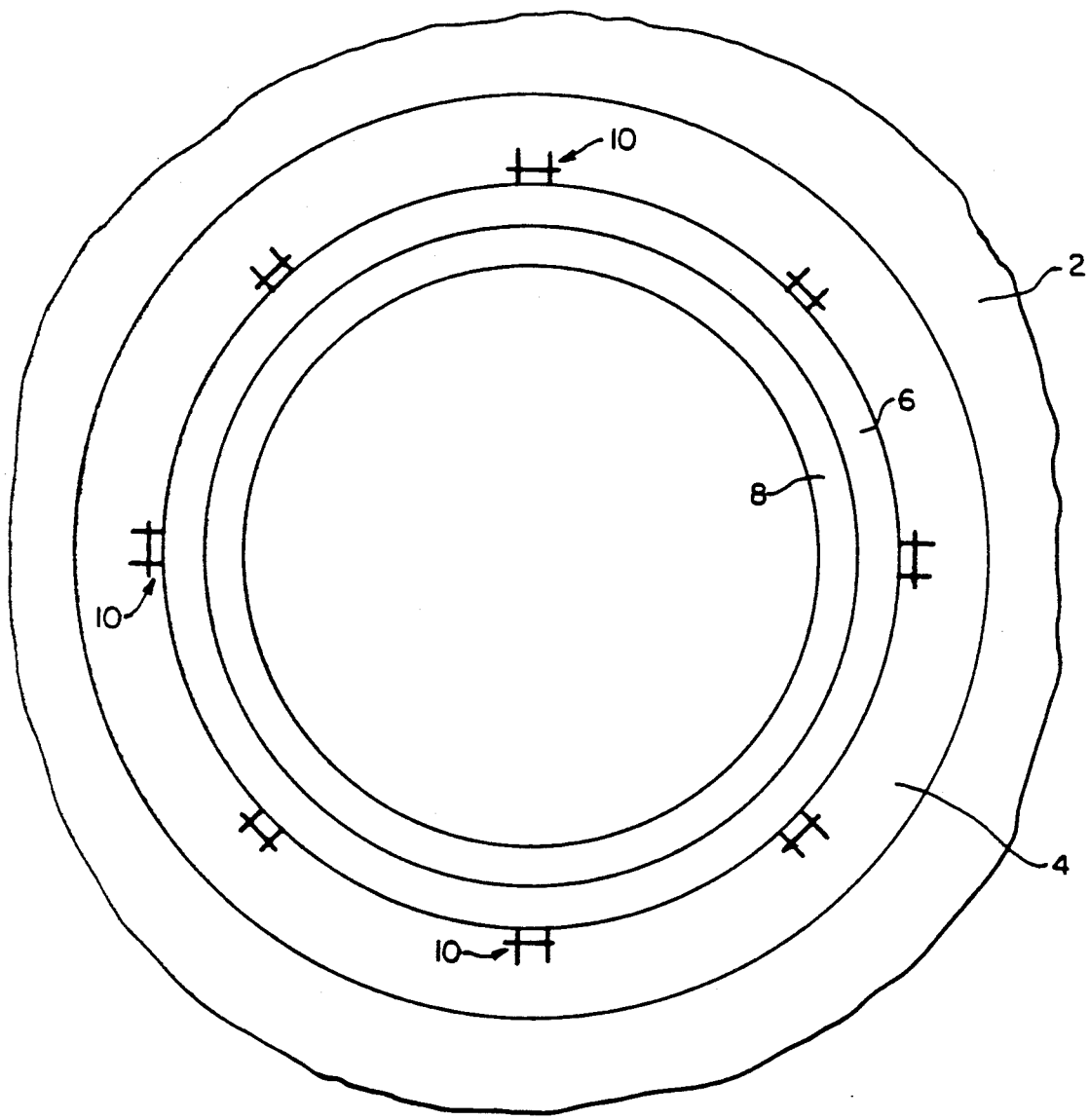
FIG. 1 is a top plan view of basic components of a hydroelectric generator equipped with stabilizing devices according to the present invention.

The plan view of FIG. 1 shows a plant floor 2 provided with a cylindrical well, or recess, 4 constituting the foundation for a hydroelectric generator. The generator includes an external stator composed of a frame 6 and stator laminations 8 secured to frame 6 in the usual manner. The generator is completed by a rotor (not shown) enclosed by stator lamination 8 and not shown in detail. Frame 6 may be mounted on the floor of well 4 in any conventional manner.

According to the invention, a plurality of stabilizing devices 10 are connected between well 4 and frame 6 at spaced locations around the circumference of the stator. In the embodiment illustrated in FIG. 1, there are eight such devices 10 equispaced about the stator circumference. Each device 10 is located on a respective radius of the generator.

Figure 2:
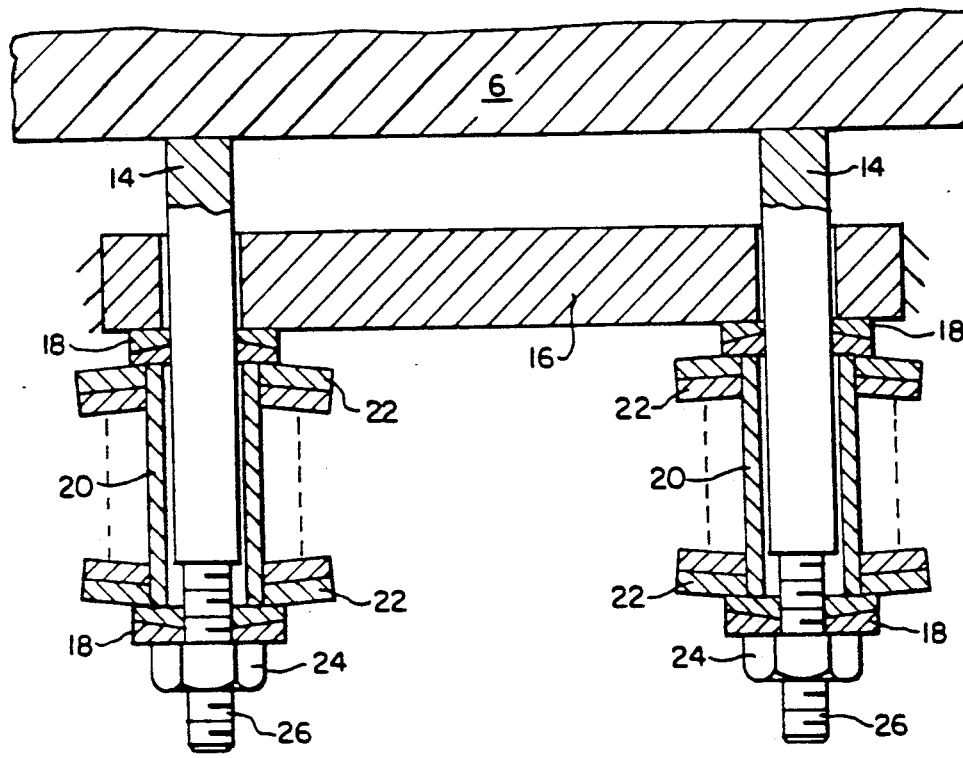
FIG. 2 is a cross-sectional detail plan view of one embodiment of a stabilizing device according to the invention.

A first embodiment of a device 10 according to the present invention is illustrated in FIG. 2. This device includes two studs 14 which are permanently secured to the outer surface of frame 6 and extend through respective openings in a plate 16 that is rigidly fastened to the floor of well 4. Studs 14 may be secured to frame 6 near its lower edge or in a region generally mid-way between its upper and lower edges.

At the side of each stud 14 which extends radially outwardly from plate 16, the stud carries two sets of spherical washers 18, a tubular spring guide 20 and a stack of disc springs 22. Each set of spherical washers 18 is composed of two generally flat washers whose mating faces are in the form of sectors of a spherical surface. Such washers accommodate tilting displacements of the associated stud while their flat outer surfaces remain in contact with adjacent components. Each stack of springs 22 extends between the associated sets of spherical washers 18, although only a portion of each stack of springs 22 is shown in FIG. 2.

A compression force, or bias, is imposed on each stack of springs 22 by tightening a nut 24 on a threaded portion 26 of the associated stud 14. The spring constant and range of compression movement of each stack of springs 22 are determined, according to known principles, by the characteristics of each spring 22, the number of springs 22 in the stack and the relative orientations of the springs 22 in the stack.

The extent of inward radial movement of the portion of frame 6 associated with a single device 10 is limited by the lengths of the associated spring guides 20. When the associated portion of frame 6 is at the limit of its inward radial movement, the length of each spring guide 20 and the thicknesses of associated spherical washers 18 determine the spacing between each nut 24 and plate 16. The dimensions of the various components are selected so that this movement limit preferably corresponds to the initial ambient temperature set point for the generator, which could be the lowest temperature which the generator is expected to experience.

When the generator is set into operation, stator will experience a certain degree of thermal expansion. Such expansion, at the location of any given device 10, acts to reduce the initial compressive loading being provided by each stack of disc springs 22. However, each stack is selected, as regards number of disc springs and relative spring orientations, to maintain a suitable radially outwardly directed spring force over the entire permissible range of radial outward movement of each portion of frame 6.

By maintaining such outwardly directed forces on frame 6, while permitting free radial thermal expansion of the stator, there is maintained on frame 6 a tensile force which can be given a level sufficient to prevent, or substantially minimize any buckling of stator laminations 8. At the same time, the radial outward forces produced by devices 10 will effectively maintain the desired degree of circularity of the stator.

Figure 3:
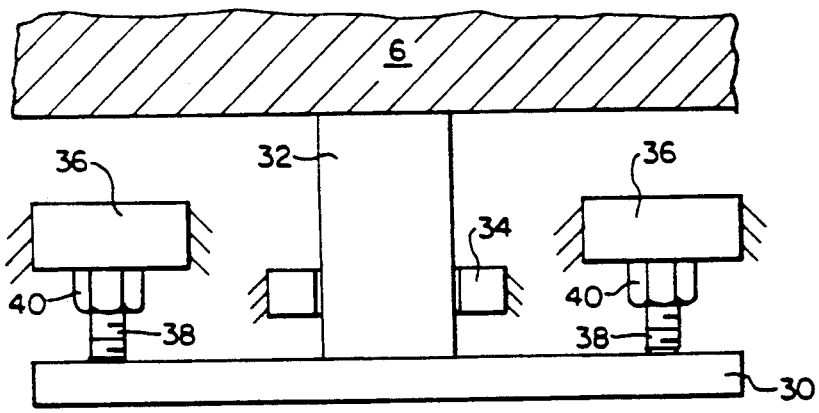
FIG. 3 is a plan view, partly in cross-section, of a second embodiment of a stabilizing device according to the invention.

A second embodiment of a device according to the present invention is shown in FIG. 3 where the stacks of disc springs of FIG. 2 are replaced by a spring bar 30. This embodiment of the device according to the present invention further includes an adapter, which may be in the form of a stud or post, 32 rigidly secured, as by welding, between a point on the outer surface of stator frame 6 and a point midway between the ends of bar 30. Adapter 32 passes through an opening in a stop member 34 which is rigidly secured to the base of well 4. Adapter 32 may be located relative to frame 6 in the same manner as studs 14.

Also secured to the base of well 4 are two foundation plates 36 each carrying a threaded stud 38 which projects from a respective foundation plate 36 by an adjustable distance. Each stud is locked in its desired extended position with the aid of an associated lock nut 40.

In the embodiment of FIG. 3, the limit of radial inward movement of the associated region of stator frame 6 is defined by contact of spring bar 30 with stop member 34. The distance by which studs 38 protrude from foundation plates 36 is set so that at the time when bar 30 is in contact with stop member 34, bar member 30 is laterally deflected to create the desired radial outward prestress, or bias, on the associated region of stator frame 6. If frame 6 experiences expansion, this will reduce the deflection of bar 30, while bar 30 continues to impose on the associated region of frame 6 a radial outward bias force of sufficient magnitude.

Figure 4:
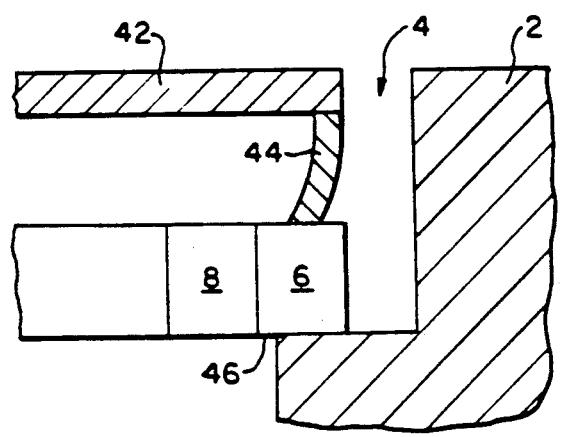
FIG. 4 is a cross-sectional, elevational detail view showing another device which can be used, according to the invention, either alone or in conjunction with devices of the type shown in FIGS. 2 and 3.

FIG. 4 illustrates, in an elevational view, a portion of the machine stator, in well 4, with an upper connecting bracket disposed above the machine. The use of such an upper bracket with machines of this type is not uncommon. In accordance with the invention, upper bracket 42 may be provided with a plurality of generally vertically extending legs 44 which are stressed, or preloaded, radially inwardly, as illustrated, before being attached to frame 6. As a result, legs 44 serve as spring members which will produce a radial outward bias force as described above.

In further accordance with the invention, the preloading imposed on frame 6 can be provided by a plurality of legs 44, as shown in FIG. 4, in combination with a plurality of devices of the type shown in FIG. 2 or FIG. 3, secured adjacent the bottom 46 of frame 6.

Other embodiments of the invention may include devices such as shown in FIGS. 2 and 3 mounted on bracket 42 and connected at the upper region of frame 6. These devices may be provided in place of or in addition to devices connected at the lower region of frame 6 and mounted in well 4.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiment are therefore to be considered in all respects as illustrative and not restrictive, the scope of the invention being indicated by the appended claims, rather than the foregoing description, and all changes which come within the meaning and range of equivalency of the claims are therefore intended to be embraced therein.

We claim:

1. In an electromagnetic rotating machine having an annular stator, the stator including a frame having a circumference and laminations secured to the frame and located radially inwardly of the frame, and the stator being mounted on a rigid foundation such that a rotor of the machine has a vertical axis of rotation, the improvement comprising a plurality or stator shape stabilizing devices each connected between said stator frame and the foundation at a respective one of a plurality of spaced points around said stator frame for imposing only outwardly directed radial forces on said frame at said plurality of spaced points in a manner to maintain a circular configuration for said frame, wherein each said device comprises spring means biased for applying only an outwardly directed radial force to said frame of said stator for a range of radial movement of the respective one of said plurality of spaced points relative to the foundation, and stop means defining a limit of inward radial movement of the respective one of said plurality of spaced points of the frame to which said device is connected, wherein each said device further includes a support member secured to the foundation and a stud secured to said frame and projecting radially outwardly from said frame, said stud having a fastening portion, and said spring means being secured between said fastening portion of said stud and said support member.

2. A machine as defined in claim 1 wherein said devices are equispaced about a circumference of said stator frame.

3. A machine as defined in claim 1 wherein said spring means comprise a stack of disc springs.

4. A machine as defined in claim 3 wherein said spring means comprise a stack of disc springs.

5. A machine as defined in claim 4 wherein said device includes two said studs and two stacks of disc springs each associated with a respective stud.

6. A machine as defined in claim 1 wherein said machine has a radius at each one of the plurality of points, said device further comprises two first members connected to one of said frame and the foundation and a second member connected to the other one of said frame and the foundation between said two first members, and said spring means comprise a bar of spring material extending transversely to the radius of said machine at the respective one of the plurality of spaced points and interposed between said first members and said second member.

7. A machine as defined in claim 1 wherein the machine has an initial ambient temperature set point and a limit of inward radial movement defined by said stop means corresponds to the initial ambient temperature set point of the machine.

8. A machine as defined in claim 1 wherein, in each said device, said support member is provided with an opening, and said stud extends through said opening.

9. In an electromagnetic rotating machine having an annular stator, the stator including a frame having a circumference and laminations secured to the frame and located radially inwardly of the frame, and the stator being mounted on a rigid foundation such that a rotor has a vertical axis of rotation, the improvement comprising a plurality of stator shape stabilizing devices each connected between said frame and the foundation at a respective one of a plurality of spaced points around said frame for imposing outwardly directed radial forces on said frame at said plurality of spaced points in a manner to maintain a circular configuration for said frame, wherein each said device comprises: two stacks of disc springs biased for applying an outwardly directed radial force to said frame for a range of radial movement of one of the plurality of spaced points relative to the foundation; a support member secured to the foundation and provided with at least one opening; and two studs secured to said frame, projecting radially outwardly from said frame and extending through the opening, with each said stack of disc springs being interposed between a respective one of said studs and said support member.

* * * * *